June 13, 1950 J. C. MORRELL ET AL 2,511,290
METHOD OF IMPREGNATING ACTIVATED CARBON
Filed May 1, 1942 5 Sheets-Sheet 1
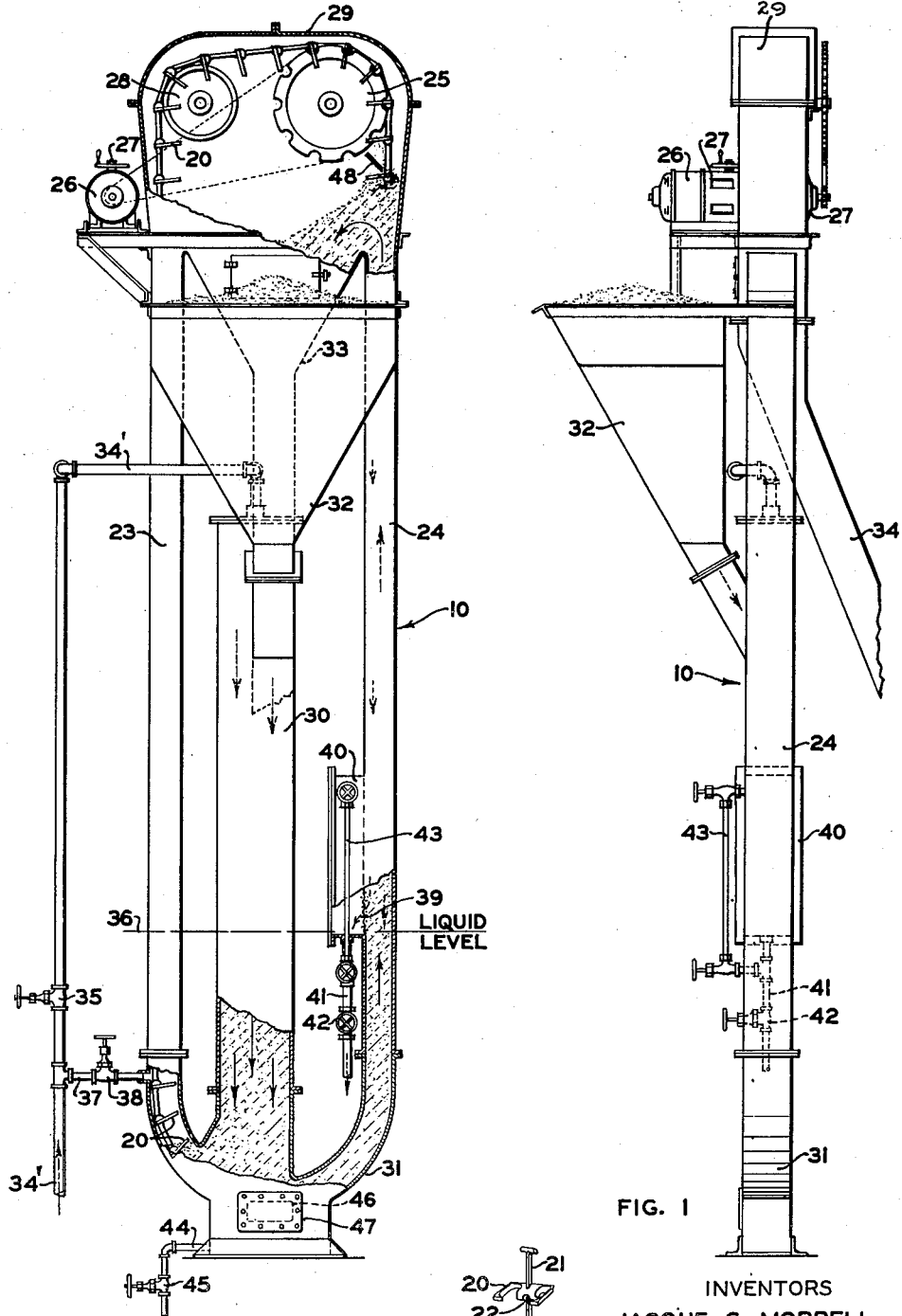
FIG. 2
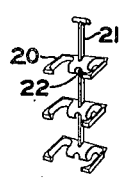
FIG. 2A
FIG. 1
INVENTORS
JACQUE C. MORRELL
GEORGE T. TOBIASSON
JESSE F. WRIGHT
BY Millard F. Peake
ATTORNEY

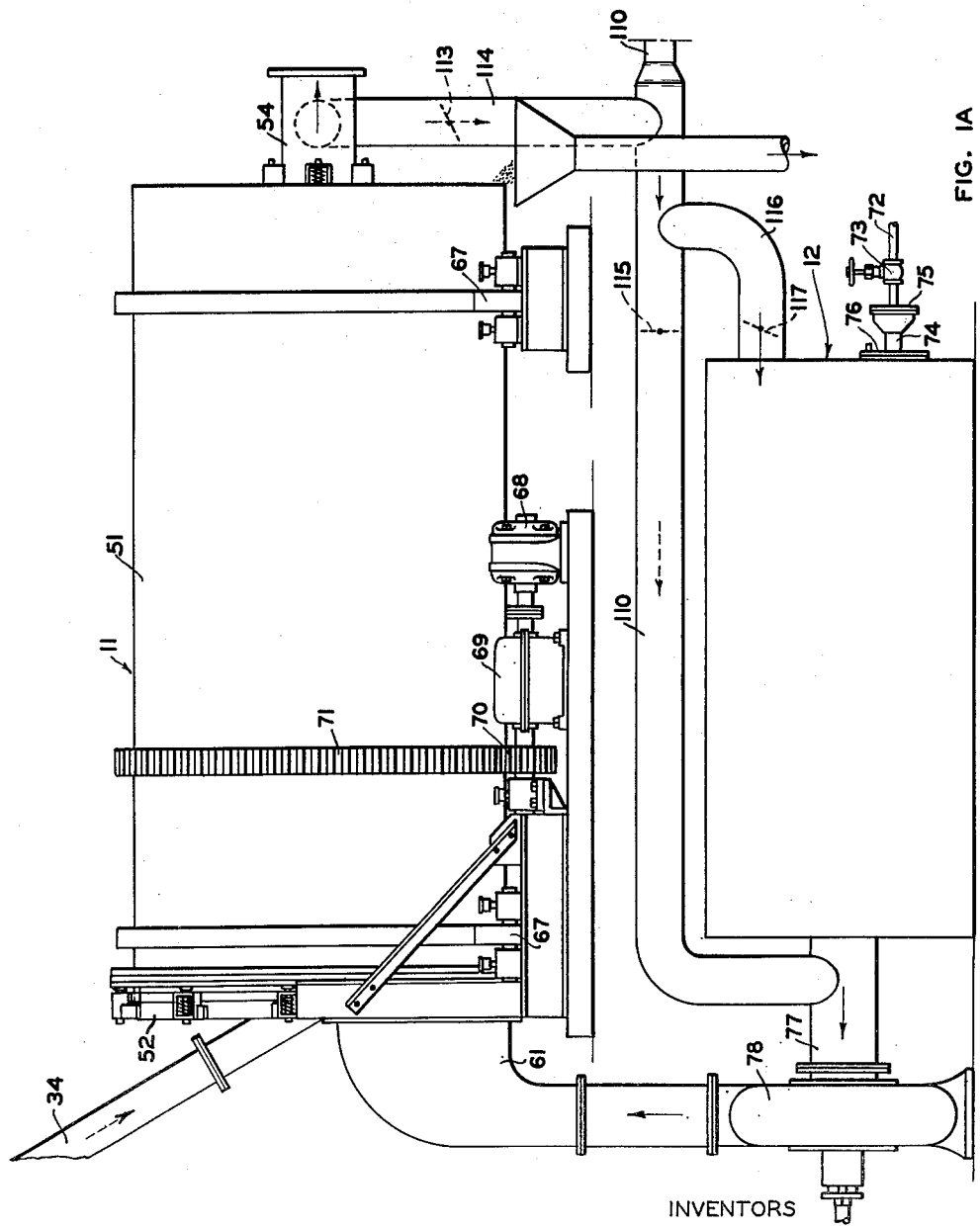

INVENTORS
JACQUE C. MORRELL
GEORGE T. TOBIASSON
JESSE F. WRIGHT
BY Millard F. Peake
ATTORNEY

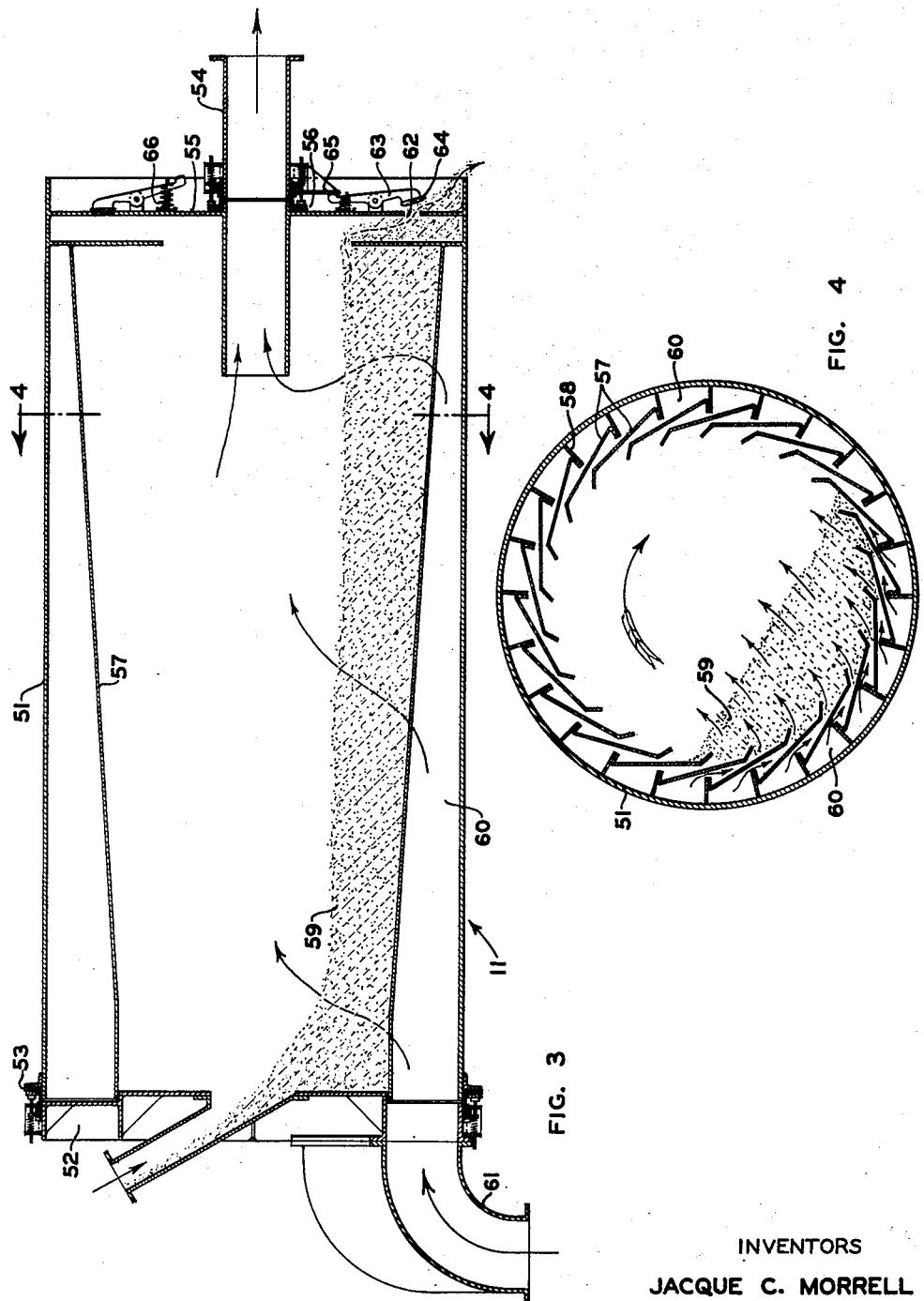

June 13, 1950 J. C. MORRELL ET AL 2,511,290
METHOD OF IMPREGNATING ACTIVATED CARBON
Filed May 1, 1942 5 Sheets-Sheet 5

INVENTORS
JACQUE C. MORRELL
GEORGE T. TOBIASSON
JESSE F. WRIGHT
BY
ATTORNEY

Patented June 13, 1950

2,511,290

UNITED STATES PATENT OFFICE 2,511,290

METHOD OF IMPREGNATING ACTIVATED CARBON

Jacque C. Morrell, George T. Tobiasson, and Jesse F. Wright, Chicago, Ill., assignors, by mesne assignments, to the United States of America as represented by the Secretary of War Application May 1, 1942, Serial No. 441,274

1 Claim. (Cl. 252—447)

The invention described herein may be manufactured and used by or for the Government for governmental purposes, without the payment to use of any royalty thereon.

The invention relates to an improved method of impregnating granular or subdivided solid material with materials which improve the characteristics thereof for its intended purpose, such as, for example, to improve its activity as a catalyst, reagent or absorbent.

The invention is more specifically concerned with the impregnation of porous solid absorbents and particularly activated carbons or charcoals of either natural or synthetic origin to improve its useful life and efficacy for the removal of noxious or lethal gases and the like from the atmosphere.

Although the invention is particularly directed to the production of chars for use in gas masks and the like, it is not limited to the production of this type of material since many or all of the advantageous steps provided will be found desirable in producing other types of impregnated solids such as natural or synthetic clays, diatomaceous earth, fuller's earth and other solids of a more or less porous nature with acids, metal salts or other materials which render it active or improve its activity as a catalyst, reagent or absorbent. However, to avoid extensive and superfluous detail with respect to the various materials which may be treated, the subsequent description which exemplifies the process, will be devoted principally to the method provided for impregnating activated carbons, and particularly cocoanut char and its synthetic equivalents, with metal salts to improve their efficiency as absorbents of poisonous gases and the like.

The impregnant employed is in the form of a solution of a metal salt or other materials which will react to form an active metal oxide and, in the preferred embodiment of the invention, the impregnating liquid is an aqueous solution of copper ammonium carbonate complex, the char being heated after thorough wetting in the solution to dry the same and to leave a deposit of active copper oxide, particularly cupric oxide in the porous char particles. The final product is not new per se, except as applied to special synthetic chars, which are not a part of the present invention, and in accordance with one established practice in making this type of product the treating or impregnating solution is produced by bubbling ammonia, carbon dioxide and air through a column of water packed with scrap copper until a solution is formed which contains approximately 7 to 9% copper, 10 to 12% ammonia and 5 to 6% carbon dioxide, by analysis. Also, in conventional practice, the absorbent char is soaked in the solution and subsequently heated to effect decomposition of the deposited copper ammonium carbonate complex and to remove excess moisture, as well as carbon dioxide and ammonia resulting from such decomposition.

The present process, as applied to the production of an impregnated char of the character above mentioned, follows the aforementioned conventional practice insofar as it comprises the steps of soaking or thoroughly saturating the char in the treating solution, and finally reacting and drying the wet material to form the final product. In its preferred embodiment the process also involves the step of producing a treating solution for subsequent fortifying or concentration, when necessary, and use within the system. This step is accomplished by passing a mixture of the gases, including ammonia and carbon dioxide, evolved in the heating, reacting and drying step through a bed of scrap copper countercurrent to a stream of water.

As distinguished from prior practice, however, the present process provides a novel and distinctly advantageous method of and apparatus for saturating or soaking the char with the treating solution, a novel and distinctly advantageous method of removing excess treating solution from the drenched char prior to final drying, a novel and distinctly advantageous method of effecting the desired reaction or conversion of the material deposited on the char and drying of the latter and novel and distinctly advantageous method of recovering volatiles and producing the treating solution.

Each of the aforementioned novel and advantageous steps provided by the invention are, in its preferred embodiment, correlated and interdependent to a high degree. However, each of the novel steps of the process will be found advantageous per se in the preparation of a wide variety of impregnated solid materials and the invention is, therefore, not limited to the entire combination of process steps disclosed.

In an early stage of the improved process provided by the invention the activated char or other solid material to be impregnated is passed as a moving bed or column through a pool or body of the treating solution. In passing through the treating solution it is immersed therein for a sufficient length of time to become thoroughly drenched or saturated with the treating solution. In most instances, as applied to cocoanut char and its synthetic equivalents, the soaking time is of the order of 20 to 30 minutes and it may be regulated to suit the requirements of the particular type of material undergoing treatment. Soaking for a time in excess of the minimum required for practically complete saturation has no detrimental effect and is preferably employed in the present process for two important reasons. It insures complete saturation of the solid material with the treating solution and obviates inadequate wetting of the solid material. Furthermore, absorpition is an exothermic phenomenon and with particularly active absorbents, such as activated carbon, it is accompanied by a considerable evolution of heat. Avoidance of the development of excessive temperature in the treating solution is necessary in this particular process to prevent the escape of desired volatiles and dissolved gases, such as ammonia and carbon dioxide, from the solution. Soaking of the solid material in the solution, which is retained in an uninsulated receptacle of good thermal conductivity, for a period of time in excess of the minimum required for its saturation affords greater time, when necessary, for the dissipation of evolved heat of absorption from the treating vessel and obviates the development of excessive temperature in the treating solution. In other words, since the process is continuous, increasing the soaking time by decreasing the speed at which the moving bed of solid material is passed through the pool of treating solution reduces the amount of absorption which takes place in a given time, thus reducing the quantity of heat evolved per unit time and affording opportunity for the dissipation of evolved heat from the solution.

Another feature of our improved process is the provision and apparatus for wetting the solid material with the treating solution prior to immersion of the latter in the pool of treating solution. This is preferably accomplished by introducing the solid material into the pool as a downwardly moving column or bed and supplying treating solution to said pool thereof by introducing it into said moving bed or column of solid material, through which it flows to the pool and wets the solid material in transit. This practice has two important advantages. To the extent that such prewetting of the solid material results in absorption of the treating solution it reduces the absorption which takes place upon immersion of the solid material in the pool of treating solution, thus reducing the evolution of heat in the latter and reducing the required soaking time. Also, difficulties have been experienced in attempting to immerse the dry solid material in the solution. Due to its relatively light weight, which results from its porous nature, the dry solid material has a tendency to float upon the surface of the pool of treating solution. By prewetting the solid material its weight is materially increased and by supplying it to the pool of treating solution as a downwardly moving prewetted bed or column its immersion is readily accomplished. Immersion of the dry solid material in the treating solution can, of course, be accomplished by emp'oying a sufficiently high column of the latter, but prewetting of the material materially reduces the required height of the column due to its increased weight per unit height.

Immersion of the solid material in the treating solution to thoroughly drench the same results in more uniform distribution of the treating solution throughout the mass of solid material than would otherwise be accomplished. This is, of course, a highly desirable if not essential feature, but soaking and drenching of the material results in the retention, in the mass of solid material discharged from the pool of treating liquid, of a quantity of moisture considerably in excess of that required for subsequent deposition of the desired impregnant. Obviously, to dry the drenched solid material to the desired degree in the subsequent heating and reaction step would involve evaporation of a quantity of water and other volatile constituents of the treating solution greatly in excess of that which would result from drying a less wet material to the same degree. That this is wasteful from the standpoint of thermal efficiency is also obvious. Draining of a considerable quantity of the excess liquid from the immersed solid material is accomplished in our improved process, and as will now be explained, materially reduces the heat load in the subsequent drying step.

It is necessary in continuous operation to continuously transport solid material from the pool of treating solution to the heating and drying quipment and this has been accomplished in prior practice by the use of a helical conveyer disposed within a fairly closely fitted conduit which is inclined at an angle and through which the wet solid material is conveyed by rotation of the helix or screw to a preliminary drying step, wherefrom it is discharged to the final drying and reaction step. Some drainage of excess liquid from the wet solid material passing through the conveyer tube is accomplished, but due to the nature of the conveyer and its inclined position, liquid seeking to flow downward along the bottom side of the conveyer tube is continually picked up on the turns of the helix which, upon their rotation, distribute a large quantity of the liquid back into the mass of solid material. Thus, drainage is materially hindered and is very inefficient with this method of transporting the wet solid material.

In distinction to this prior practice, the present invention provides apparatus which permits substantially free and unhindered drainage of excess liquid from the solid material discharged from the pool of the treating solution prior to its introduction into the drying step. This may be accomplished, for example, by employing an elevator or conveyer of the endless chain type wherein the wetted solid material is elevated from the pool of treating solution to a point wherefrom it will flow by gravity to the final drying and reacting step. The spaced pushers or elevators which are linked together to form the endless chain of the conveyer are preferably of open or skeleton-like construction, such as illustrated, for example, in the accompanying drawing, and preferably the leg of the conveyer or elevator through which the wet material is transported is substantially vertical. This permits the substantially free and unhindered drainage of excess liquid back through the upwardly moving bed or column of solid material to the pool of treating solution wherefrom the wet solid material is discharged and the descending excess liquid flows through the bed or column of solid material so that, as the latter moves in an upward direction, it is progressively less laden with excess liquid throughout its height and is substantially free of excess liquid at the upper or discharge end of the column. With this method of transporting and draining the wetted solid material, the tendency for the conveyer to pick up the draining liquid and redistribute it to the mass of solid material is eliminated or at least greatly reduced and tests have proven that the moisture content of the solid material is reduced to a considerably greater degree with this method of transportation and draining, as compared with the prior practice above mentioned. As a result of this we have been able to eliminate the preliminary drying step employed in prior practice without increasing the heat load in the final drying and reaction step, thus simplifying the process and reducing its cost by reducing the total heat requirement.

Heating of the solid material to dry the same to the desired degree and to decompose the deposited copper ammonium carbonate complex has been accomplished in prior practice by passing the relatively wet solid material from the pre-drying step through an externally heated zone wherein the decomposition reaction and evolution of the volatiles takes place. Conventionally this is done in a rotating retort heated by the passage of hot combustion gases about its shell in heat exchange relation but out of direct contact with the solid material. The heating and reaction step of the present process differs, in its preferred embodiment, in that the reaction and drying of the solid material is accomplished by passing hot, oxygen-containing gases in direct and intimate contact therewith. This is not only a more thermally efficient method of accomplishing drying, but also appears to promote or hasten the desired reaction. This can be appreciated from the fact that the impregnant, in its final form, is copper oxide and that the reaction involves oxidation. The reaction can and has been conducted by employing substantially oxygen-free hot gas as the heating medium, such as nitrogen, for example, but the beneficial effect of employing hot, oxygen-containing gases as the heating medium and passing the same in direct and intimate contact with the material undergoing drying will be apparent from the above explanation, both from the standpoint of increasing the efficiency of the drying operation and from the standpoint of insuring substantially complete oxidation of the deposited final impregnant.

Another feature of the drying step of the improved process, in its preferred embodiment, resides in the provisions which make possible the efficient use of relatively hot gases for the drying step. The carbonaceous solid material to be impregnated is, of course, combustible. The activated cocoanut char or synthetic char preferably employed is of a highly active nature and its impregnation with the metal oxide further materially reduces the temperature at which it will ignite. The temperature at which this particular material will begin to glow or ignite in an oxidizing atmosphere is of the order of 350 to 500° F. and in our early experiments care was exercised to keep the temperature of the hot gaseous drying medium below or relatively close to this ignition temperature so as to avoid destruction of the finished product or impairment to its activity. This necessitated the use of a large volume of relatively low temperature gases per unit volume of solid material treated and, although drying in this manner is entirely within the scope of the invention, a materially less expensive and faster method of drying has been devised in our more recent work. This involves either one or, preferably, a combination of two important factors which will now be explained.

The solid material as it enters the drying equipment contains a relatively large amount of moisture and volatile constituents and their evolution from the mass of solid material requires the application of a considerable quantity of heat which is consumed as latent heat of vaporization. Thus, while large quantities of volatiles are being evaporated from the mass, the endothermic nature of the reaction keeps the mass relatively cool and we have found that, during at least the initial stages of the drying step, while the mass of solid material remains relatively wet, the gas employed for drying may be at a materially higher temperature than the ignition temperature above mentioned. For example, temperatures as high as 960° F. have been used without detrimental results and although higher temperatures have not been explored, we believe a temperature as high as 1000° F. or even more may be employed.

The other factor involved has to do with the total heat content of the hot gaseous drying medium contacted with the solid material in a given time. While the material is relatively wet, a relatively rapid rate of heat input can be safely employed since a large portion of the heat supplied to the material is consumed as latent heat and does not increase the temperature of the material. But as it becomes progressively drier and the latent heat load is reduced, the rate at which heat can be safely supplied to the solid material is correspondingly reduced. Therefore, in the preferred embodiment of the invention the continuous drying operation is accomplished with gases at a considerably higher temperature than the ignition temperature of the dry solid material and the rate of heating is kept below that which will cause the development of excessive temperature in the bed of solid material either by progressively decreasing the temperature of the gases in the direction of travel of the moving bed of solid material through the dryer or by progressively increasing the volume of the moving bed of solid material in the direction of its path of travel through the dryer in relation to the volume of hot gases passed therethrough in a given time, or preferably by a combination of both decreasing temperature and decreasing volume of the hot gases. With this combination of features the efficiency and speed of the drying operation is greatly improved.

Another improvement accomplished in the preferred embodiment of the invention is the increased recovery of valuable volatiles evolved during the reaction and drying step. Although ammonia is not ordinarily costly, it is at present a strategic material. Obviation of its waste is therefore a decided advantage regardless of its normal cost of production.

The materials evolved in the drying step comprise water vapor or steam, carbon dioxide and ammonia in admixture with the gaseous heating medium employed, which is ordinarily combustion gases. The concentration of ammonia in this mixture is relatively low and the latter may be recovered, in part, by condensation from the evolved vapors and gases. Alternatively, or in conjunction with the condensing step, additional quantities of ammonia can be recovered and simultaneously utilized to produce treating solution within the system by passing the uncondensed material through a packed column containing copper in counter-current contact with water supplied to the upper portion of the column. Recovery of the ammonia in both the condensing step and in the step wherein the treating solution is formed is improved as the concentration of ammonia in the mixture supplied to these respective steps increases.

To increase this concentration of ammonia we provide for recirculating to the drying step regulated quantities of the volatiles, including ammonia, evolved therein. Preferably, the thus recycled gases are utilized to reduce the temperature of freshly generated hot combustion gases being supplied to the drying step to the desired degree and thus the recycled gases serve both as a tempering medium and as a means of increasing the concentration of ammonia in the mixture supplied to the condensing step and/or to the step wherein the treating solution is produced. By tempering the freshly generated hot combustion gases in this manner, the use of large quantities of excess air for cooling the same is avoided and their oxygen concentration as well as their temperature is thus kept at a value suitable for accomplishing efficient drying and oxidation of the deposit without excessive heating and without burning of the combustible solid material, particularly when employed in combination with the improved method of drying, above described.

The accompanying drawing comprising Figures 1, 1A, 1B, 2, 2A, 3, 4 and 5 diagrammatically illustrates apparatus in which the process provided by the invention may be conducted.

In the drawing Figures 1, 1A and 1B comprise an elevational view of the improved impregnating apparatus with portions shown in section.

Figure 2 is a front view, shown partially in section, of the conveyer 10 of Figure 1.

Figure 2A is a perspective view of some of the linked sections which form the endless chain of conveyer 10.

Figure 3 is a longitudinal section of the drying and reaction vessel of Figure 1A.

Figure 4 is a cross-sectional view of the drying vessel 11 of Figures 1A and 3, the section being taken along line 4—4 in Figure 3.

Figure 5:
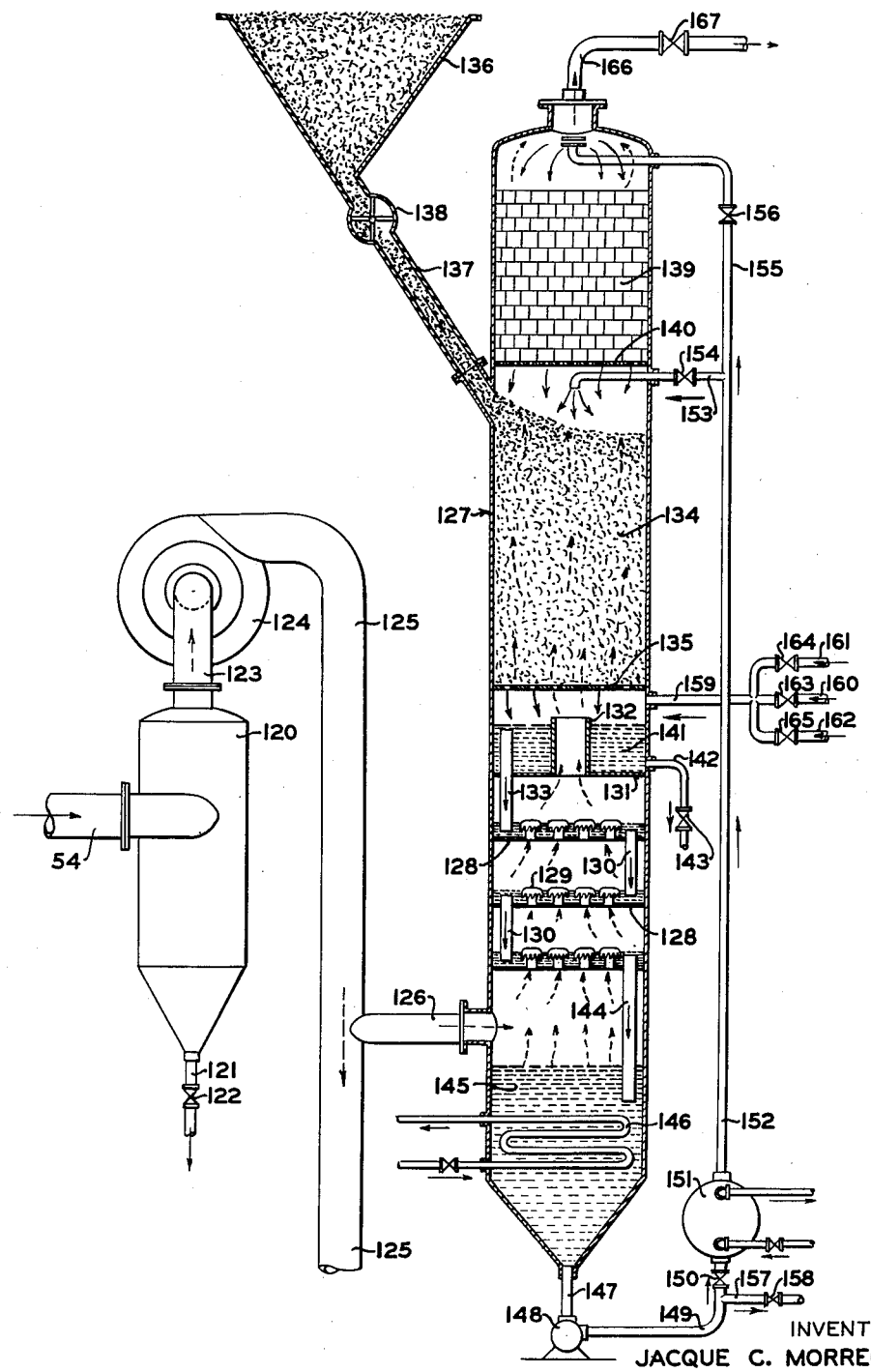

Figure 5 illustrates another form of recovery apparatus which may be substituted for that illustrated in Figure 1B Referring now particularly to Figures 1, 1A, 1B and 2, the major equipment comprises conveyer 10 wherein the char is prewetted and then immersed in the treating solution and subsequently drained, a rotary dryer and reactor 11 to which the drained char is supplied from conveyer 10, a furnace 12 wherein combustion gases for use in the dryer 11 are generated, a scrubbing column 13 whereto combustion gases and evolved volatiles from dryer 11 are supplied, a condenser 14 which receives the scrubbed gas mixture from column 13, a receiver 15 wherein condensate and uncondensed gases from condenser 14 are separated and a solution-generating column 16 to which combustion gases and uncondensed volatiles from receiver 15 are supplied and wherein a relatively weak treating solution is produced which may be subsequently concentrated or fortified for use within the system.

The conveyer or elevator 10 is of the endless chain or continuous flight type, previously mentioned, in which the conveyer chain comprises a multiplicity of substantially U-shaped members 20 shown in perspective in Figure 2A and having legs 21 joined by a swivel connection, as indicated at 22, to form the conveyer flight or chain. The members 20 forming the endless chain are disposed within and transverse the opposite legs 23 and 24 of the conveyer, their direction of travel being in a counter-clockwise direction in the case illustrated. At the top of the conveyer the endless chain or flight, composed of members 20, rides on a sprocket-wheel 25 driven at the desired speed by any suitable means, such as, for example, the motor 26 and variable speed reducer 27. In addition to the sprocket-wheel 25, an idler 28 over which the endless chain or conveyer flight also passes is provided in the upper case or cover 29.

A vertical feed tube 30 communicates at its lower end with the substantially U-shaped bottom section 31 of the conveyer case, which joins the opposite legs 23 and 24, and the feed tube communicates adjacent its upper end with the hopper 32 for the char. The char travels downwardly from hopper 32 through the feed tube 30 into the U-shaped section 31 of the case and is carried or pushed by members 20 through section 31 and upwardly through leg 24 into the upper section 29 of the conveyer case wherein it overflows the upper extremity of leg 24 and passes into the discharge throat 33, wherefrom it flows through conduit 34 to the dryer 11.

The treating solution with which the char is to be drenched is supplied from storage or elsewhere, as desired, through line 34' and preferably at least a portion of the treating solution is directed through valve 35 in line 34' into the upper end of the feed tube 30 wherein it contacts and prewets the char, flowing downwardly in the tube 30 with and through the downwardly moving bed or column of char therein into the pool of treating solution maintained in the lower portion of the conveyer case. A suitable liquid level, indicated at 36, is maintained and when all of the treating solution required to maintain this liquid level is not supplied through standpipe 30, it may be introduced into the conveyer case from line 34' through line 37 and valve 38.

The speed at which the endless chain or conveyer flight travels through the case determines the soaking time for the char in the pool of treating solution and is regulated to suit requirements by the variable speed reducer 27.

In passing upwardly through leg 24 above liquid level 36, excess liquid drains back through the moving bed or column of char and the form of members 20 permits its substantially free and unhindered drainage. A suitable screen 39 extending from approximately the desired liquid level to a point above the same replaces a portion of one side of leg 24 of the case and overflow liquid from the pool of treating solution, as well as liquid drained back through leg 24, passes through this screen into a suitable closed case 40 wherefrom it is withdrawn through line 41 and valve 42 to maintain the desired liquid level. A gauge glass 43 is provided, in the case here illustrated, for visual indication of the liquid level. The liquid level is prevented from falling below the desired point by supplying to the case a quantity of treating solution in excess of that required to thoroughly wet the char, and in case this quantity is greater than that required for prewetting the char in the feed line or standpipe 30 to the desired degree, the additional quantity may be supplied, as previously indicated, through line 37 and valve 38. The rate of feed for the treating solution, once established, may be substantially constant and valve 42 may be left open to maintain the desired liquid level.

Drain line 44, having valve 45, is provided at the bottom of the case and an access opening 46 having a removable closure plate 47 is also provided at the bottom of the case for removing char therefrom when it is desired to empty the conveyer. A push-out plate 48, which fits between the legs of members 20, is provided in the upper section 29 of the case beneath sprocket-wheel 25 to insure substantially complete removal of the char from the conveyer flight before it passes over the sprocket.

Referring now to Figures 3 and 4, as well as Figure 1A, the dryer 11 is of the rotary type and is designed to bring hot gases in direct contact with a moving bed of the char discharged from conveyer 10. It comprises an outer shell 51 which is slowly rotated, as will be later described, a stationary inlet head 52 which bears against the inlet end of the shell 51, the joint therebetween being sealed as indicated at 53, to prevent leakage and a stationary gas discharge conduit 54, with the joint between the latter and the rotating end 55 of the shell sealed as indicated at 56.

A plurality of louvers 57 extending longitudinally of shell 51 are secured thereto at spaced points about its inner surface and rotate with the shell. The radial legs 58 of these louvers taper gradually from adjacent the inlet end of the shell to its opposite end and are longest adjacent the inlet end. This construction provides a sloping interior surface, spaced from the shell 51, upon which the bed of char, indicated at 59, rides in travelling through the dryer, the bed being progressively deeper, as indicated, from adjacent the discharge end to adjacent the outlet end of the dryer.

Due to the rotation of the dryer the surface of the bed 59 slopes from a horizontal position, as indicated in Figure 4, the slope corresponding to the angle of repose of the char. The bed is in direct communication through the openings between the adjacent louvers 57 with some of the spaces 60 between the radial legs of the louvers and between the bed and shell 51. Each of the spaces 60 passes in communication with the bed as the shell and louvers rotate and hot gases for the drying operation are admitted only to the spaces 60 which are in communication with the bed 59, by virtue of the construction of the stationary head 52 and the construction and position of the hot gas inlet hood 61. The heating and drying gases pass from hood 61 into the spaces 60 communicating with bed 59 and pass therefrom between the adjacent louvers 57 into and through the bed, as indicated by the arrows in Figure 4.

As indicated in Figure 3, the spaces 60 are of decreasing cross-sectional area from adjacent the inlet to adjacent the outlet end of the shell. Due to this construction and the decreasing depth of the char bed from adjacent the inlet to adjacent the discharge end of the dryer, the quantity of hot gases contacted with a unit volume of char is progressively diminished from adjacent the inlet end of the dryer, where the char is relatively wet, to adjacent the outlet end of the dryer, where the char is relatively dry. Also, the shell 51 is preferably left bare or uninsulated and, due to the transfer of heat from the gases through the shell to the atmosphere and heat transfer from the gases to the louvers and char bed along their path of travel through the dryer, they are cooler at the discharge end where they come in contact with the relatively dry char than at the inlet end where they come in contact with the relatively wet char. Thus, the heat content of the gases contacted with the char is progressively diminished as the moisture content of the char is reduced in travelling through the dryer.

As previously indicated, wet char from the conveyer 10 is supplied to the inlet end of the dryer through conduit 34. As the char bed travels through the dryer its moisture content is reduced to the desired value and vaporization of the water and other volatiles in the treating solution with which the char is wetted leaves a deposit of the desired impregnant in the char particles, the heat for drying also serving to decompose the active ingredient of the char solution, such as the copper ammonium carbonate complex, leaving a residual deposit of copper oxide. Thus, in the preferred embodiment of the invention the volatiles evolved are steam, ammonia and carbon dioxide and the gases discharged from the dryer through the gas outlet conduit 54 comprise these materials in admixture with combustion gases.

One or a plurality of openings 62 are provided through the discharge head 55 of the dryer at a distance from the cylindrical shell 51 which will bring the openings within the area of the char bed 59 as they pass through the sector occupied by the latter. During their passage through this sector that end of the rocker-arms 63 which is provided with a pad of asbestos or the like 64, for covering the openings, is lifted by sliding contact of the opposite end of the arm with a segmental member 65 provided on the stationary discharge conduit 54, so that char is discharged through the openings 62 while the latter are in communication with the char bed. At other points in the cycle of rotation the arms 63 are out of contact with segment 65 and are held by springs 66 in a position to close the openings 62.

The dryer rides, in the case here illustrated, on suitable roller trunnions 67 disposed on opposite sides of the drum adjacent its opposite ends and is rotated by a suitable motor 68 which drives pinion 70 through speed reducer 69, the pinion engaging a ring gear 71 provided on the shell of the dryer.

The furnace or combustion gas generator 12 is supplied with fuel through line 72, valve 73 and burner 74. A gaseous fuel is employed, in the case here illustrated, and air for its combustion is admitted to the burner through the adjustable air inlet 75. Regulated quantities of air in excess of that required for combustion of the fuel are supplied to the combustion zone through an adjustable air inlet 76. The hot combustion gases generated in furnace 12 are discharged therefrom through duct 77 wherein they commingle with regulated quantities of relatively cool gases to reduce their temperature to the desired degree, as will be later described, and wherefrom they are supplid by the fan or blower 78 to the inlet hood 61 of the dryer and therefrom into contact with the bed of char as previously described.

Figure 1B:
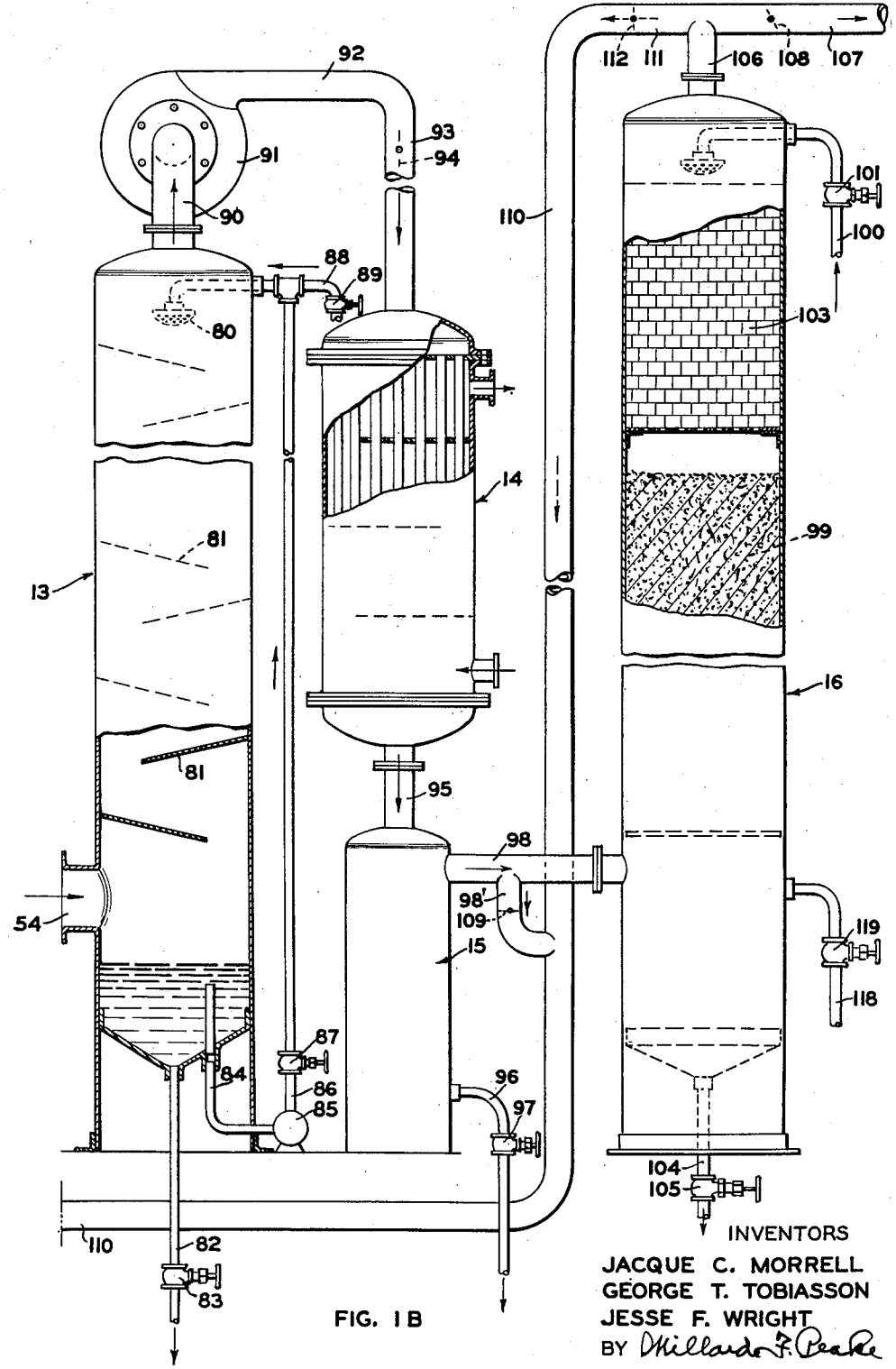

Referring now particularly to Figure 1B, the mixture of combustion gases and evolved volatiles discharged from the dryer through conduit 54 are admitted to the lower portion of scrubbing column 13 and are discharged upwardly therethrough in direct countercurrent contact with liquid supplied to the upper portion of this zone through a suitable spray device 80, as will be later described. The column is provided with baffles 81 or other suitable means of obtaining contact between the ascending gases and the descending liquid and the liquid entrains and removes from the gases dust and other solid material transported with the gas stream from the dryer. The washing liquid collects in the lower portion of column 13 wherein sediment is allowed to settle and is withdrawn through line 82 and valve 83. Liquid from which the solid material has settled is directed from the lower portion of the column through line 84 to pump 85 by means of which it is recirculated through line 86 and valve 87 back to the upper portion of the column for reuse as washing liquid. At the start of the operation water is admitted to the upper portion of the column and to spray device 80 through line 88 and valve 89.

The washed or scrubbed gases are directed from the upper portion of column 13 through duct 90 to fan or blower 91 wherefrom they are discharged through duct 92 and are directed therefrom, all or in part, through duct 93 containing damper 94 to condenser 14. In the condenser a suitable cooling medium, such as water, is circulated in indirect contact and heat exchange with the gases to condense a substantial portion thereof, including ammonia and carbon dioxide in solution with water. The resulting condensate and uncondensed gases are directed from condenser 14 through line 95 to receiver 15 wherein the uncondensed and undissolved gases are separated from the condensate, the latter being withdrawn from the receiver through line 96 and valve 97 and the gases being directed through duct 98 to column 16.

In column 16 the gases contact a porous bed 99 of copper turnings or other scrap copper and a considerable portion of the remaining uncondensed ammonia and carbon dioxide in the gases react with the copper to form the desired copper ammonium carbonate complex. Water is supplied to the upper portion of column 16 through line 100 and valve 101 and passes downwardly through the column countercurrent to the ascending gas stream, wetting the bed of copper as it passes therethrough and taking the copper ammonium carbonate complex into solution. When desired, particularly in case the gas mixture supplied to column 16 is low in air or uncombined oxygen, air from an external source may be supplied to the lower portion of column 16 through line 118 and valve 119 in the quantity required to obtain the desired oxidation of the copper ammonium carbonate complex generated in the column. Packing or other suitable contacting means, indicated at 103, is provided in column 16 above the bed 99 for obtaining contact between the water introduced into the column and the gases which have passed through the bed of copper to effect further recovery of ammonia and carbon dioxide not reacted in the copper bed. The relatively weak aqueous solution of the copper ammonium carbonate complex formed in column 16 is collected within the lower portion thereof and withdrawn through line 104 and valve 105 to storage or elsewhere, as desired. By concentrating this solution or fortifying it with a stronger solution, it may be brought to the strength required for further use within the system. Waste gases are discharged from the upper portion of column 16 and from the system through duct 106 and duct 107, containing damper 108.

Preferably, regulated quantities of the mixture of combustion gases and volatiles evolved in the drying operation are recirculated to commingle with and cool the combustion gases generated in furnace 12 prior to their contact with the char, such commingling also serving to reduce the oxygen concentration of the drying gases to the desired degree and to increase the concentration of ammonia in the gases supplied to the recovery equipment. Preferably, gases for recycling are taken after passage through condenser 14 and receiver 15 from duct 98 thru duct 98' controlled by adjustment of damper 109 to recirculation duct 110, but it is also within the scope of the invention to recirculate gases which have passed through column 16 by the adjustment of damper 112 in duct 111 which connects ducts 106 and 110 or to recycle gases from the dryer prior to their introduction into column 13 by the regulation of damper 113 in duct 114 which connects ducts 54 and 110. The recycled gases may be directed, all or in part, past the damper 115 in duct 110 to commingle in duct 77 with the hot gases discharged from furnace 12 or they may be commingled with the combustion gases in the furnace by passing the recycled gases, all or in part, from duct 110 through duct 116 past damper 117 into the furnace.

It will, of course, be understood that the invention is not limited to conducting the process in the particular apparatus here illustrated and that many departures from and modifications of the specific form of apparatus illustrated may be employed without departing from within the scope of the invention. Another form of recovery and solution-generating system is shown in Figure 5 and will be subsequently described.

Although we prefer to employ a sealed retort in the drying step in order to prevent the leakage of gases therefrom and to prevent the leakage of air from the atmosphere into this zone so that the oxygen concentration of the atmosphere in the drying zone may be controlled within the desired limits to prevent combustion of the char, it is also within the scope of the invention to use a retort which is not sealed at the char inlet and at the gas and char outlets. In the latter instance the inlet and outlet pressures of the retort are preferably balanced by regulation of fan or blower 91 and the hot gas fan 78 to prevent any substantial leakage of gases from the retort and to prevent any substantial leakage of air into the same from the atmosphere.

It is also within the scope of the invention to locate fan or blower 91 in the duct 106 from column 16, but since the increased recovery of carbon oxide is obtained with increased pressure and condensation of the ammonia is facilitated as the pressure increases, we prefer to utilize pressure developed by the fan or blower 91 in condenser 14 and column 16. Also, with a sealed retort it is possible to eliminate the hot gas fan or blower 78 by making provision for operating the combustion zone at a slight superatmospheric pressure and supplying the required air to the combustion zone and to burner 74 under pressure.

Referring now to Figure 5, which, as previously mentioned, illustrates an alternative form of recovery apparatus which may be substituted for that shown in Figure 1B, although they are not to be considered equivalent, the gases discharged from the drying step through duct 54 are supplied to a suitable separator 120 which, in the case here illustrated, is of the cyclone type and wherein dust and similar solid particles carried with the gases from the drying step are separated therefrom. The dust particles collect in the lower portion of separator 120 from which they are removed through line 121 and valve 122. The gases from which dust particles have been separated are directed from the upper portion of the separator through duct 123 to the fan or blower 124, motivated by suitable well known means, not illustrated, wherefrom they are directed through duct 125 and may, when desired, be directed in regulated quantities to duct 110 (see Figure 1A) and thus recycled to the drying step. A quantity of gases from separator 120, representing the net make of this material not recycled to the drying step, is directed from duct 125 through duct 126 into the recovery and solution-generating column 127.

In column 127 ammonia and carbon dioxide present in the gases discharged from the drying step are recovered and simultaneously utilized to generate an aqueous solution of the copper ammonium carbonate complex for use within the system to treat the char. The column comprises an upper, an intermediate and a lower section. The lower section contains a plurality of suitable contacting means, such as the bubble trays indicated at 128, which may be of conventional form having bubble caps 129 and downpipes 130. This lower section is separated from the intermediate section of the column by a suitable partition 131 provided with the vapor riser 132 and the downpipe 133. Above the partition 131 in the intermediate section of the column, a bed 134 of scrap copper is provided and supported, in the case here illustrated, on a suitable perforate plate 135. Since copper is consumed from the bed in generating the treating solution, provision is made, in the case here illustrated, for maintaining the bed by continuously or intermittently supplying scrap copper thereto from hopper 136 through a suitable conduit 137 provided with a suitable feeding device, such as the conventional star feeder indicated at 138. The upper section of the column comprises suitable contacting means, such as packing 139 of any suitable form supported, in the case illustrated, upon perforate plate 140 disposed above bed 134.

Gases from the drying operation which have passed through the lower portion of the column, as will be later described, enter bed 134 through perforate plate 135 and in passing upwardly through the bed come in intimate contact with the copper which is continuously wetted with water, as will be later described. The ammonia and carbon dioxide in the gases react with the wetted bed of copper and the resulting copper ammonium carbonate complex is taken into solution in the water. Some of the carbon dioxide and ammonia also goes into solution without reacting with the copper. The solution thus formed flows downwardly through the copper bed and is collected as a pool, indicated at 141, above partition 131, from which it is withdrawn in regulated quantities through line 142 and valve 143. Solution from the pool 141 overflows the upper end of downpipe 133 and is supplied therefrom to the uppermost bubble deck 128. Liquid from the pools thereof maintained on the bubble decks passes through the downpipes 130 to the successive bubble decks and is supplied from the lowermost bubble deck through downpipe 144 into the body of liquid 145 maintained in the lower portion of the column.

The gases from the drying step which are supplied, as previously described, to column 127 contain a considerable quantity of heat and in passing through the bubble decks they come into direct and intimate contact with the pools of liquid maintained thereon and supply heat to the liquid for liberating dissolved ammonia and carbon dioxide therefrom. In case additional heat is required for reboiling and substantially stripping the liquid of dissolved ammonia and carbon dioxide it may be supplied to the body of liquid 145 in the lower portion of the column by passing a suitable heating medium through the closed coil 146 immersed therein. The volatiles evolved from the body of liquid 145 and from the bodies of liquid on each of the bubble trays pass upwardly from the lower section of the column through vapor riser 132 and into contact with the copper bed 134.

The reboiled liquid will consist principally of water, containing some copper ammonium carbonate complex in solution and substantially free of dissolved gases. It is directed from the lower portion of the column through line 147 to pump 148 wherefrom it is directed through line 149 and is supplied, all or in part, through valve 150, cooler 151 and line 152 into the intermediate section of the column above the bed 134 via line 153 and valve 154 or, in addition to, or instead of being supplied entirely to the intermediate section of the column, it may be directed, all or in part, through line 155 and valve 156 into the upper section of the column above the packing 139. The gases evolved in the drying step will contain a substantial quantity of water which may be more than that desirable for generating treating solution of the desired concentration in column 127. In such instances, excess water or weak treating solution formed in column 127 may be discharged from the system through line 157 and valve 158, communicating with line 149.

It is also within the scope of the invention to introduce air and, when desired, additional quantities of ammonia and carbon dioxide to column 127 and into contact with bed 134 by supplying the same to the intermediate section of the column beneath this bed through line 159 and the respective lines 160, 161 and 162, controlled by the respective valves 163, 164 and 165.

The upper section of the column containing the packing material 139 is intended to substantially free the gases which escape reaction or solution in passing through bed 134 of ammonia. This is accomplished by countercurrently contacting the gases in the upper section of the column with the water or substantially gas-free solution supplied thereto, as previously described, through line 155 and valve 156. Remaining uncondensed and undissolved materials are directed from the upper portion of the column through line 166 and valve 167 and the latter may be employed to control pressure in the column. Liquid and dissolved gases from the upper portion of the column flow downwardly therefrom into contact with the copper bed 134 to be supplemented, when desired, by liquid separately supplied to the intermediate section of the column through line 153 and valve 154.

It will be apparent from the above description that column 127 may be operated not only to recover all or a substantial quantity of the ammonia and carbon dioxide in the gases evolved in the drying step, but also to utilize the same for generating treating solution of the desired concentration. This results from the provision for continuously reboiling treating solution from pool 145 in the lower portion of the column, for returning gases evolved in the reboiling step into contact with the bed of wetted copper and for separately returning the reboiled liquid through the copper bed countercurrent to the ascending gases.

In the preferred operation of the recovery and solution-generating step substantially all of the steam contained in the gases from the drying step supplied to column 127 is condensed therein and a sufficiently low temperature is maintained at that point in the intermediate section of the column wherein the pool 141 of treating solution is collected to prevent substantial decomposition of the copper ammonium carbonate complex, control of this temperature being accomplished by the degree of cooling effected in cooler 151 and by the quantity of reboiled liquid recycled to the upper and intermediate sections of the column. Also, in the preferred embodiment of the invention, since the reboiled liquid collected in the lower portion of column 127 will contain some dissolved copper ammonium carbonate complex, instead of withdrawing any excess of this liquid from the system, we prefer to supply additional quantities of ammonia and, when required, carbon dioxide to the column from an external source, as previously described. Ordinarily, the air in the gas mixture from the drying step will not be sufficient to give the desired oxidation of the copper ammonium carbonate complex in the recovery and solution generating system. Therefore, the additional air required is supplied through line 160, valve 163 and line 159 from an external source.

As an example of one specific operation of the process, conducted in accordance with the provisions of the invention and in an apparatus such as illustrated and above described, a synthetically produced activated domestic charcoal of approximately 12 to 20 mesh (U. S. screen size) was treated with an aqueous solution of copper ammonium carbonate complex and dried to produce a char impregnated with cuprous oxide suitable for use in gas masks and the like.

The treating solution contained, by analysis, approximately 10% copper, approximately 17% ammonia and approximately 10% carbon dioxide. The char was prewetted with the solution and thereafter soaked and dried in an apparatus such as illustrated in Figures 1 and 2. The soaking time of the prewetted char in the pool of liquid treating solution was approximately 35 minutes and the drying time was approximately 30 minutes. The drained char had a total volatile content of approximately 46% by weight which is appreciably lower (3 to 5% less) than the total volatile content of the same char supplied to the predrying step in the conventional prior practice referred to in the foregoing specification. The predrying step was therefore eliminated in this operation and the drained char supplied to a final dryer and reactor such as shown in the accompanying drawing.

The inlet temperature of the oxygen-containing combustion gases supplied to the drying step was approximately 950° F. and the temperature of the combustion gases and evolved volatiles discharged from the drying step was approximately 350° F. The temperature of the impregnated and dried char discharged from the dryer was of the order of 330 to 350° F. and the drying was accomplished speedily and economically without ignition of the char. The moisture content of the impregnated and dried char was approximately 1% by weight.

When tested in accordance with the methods officially adopted by the War Department, the char produced in the above operation had a hydrogen cyanide life of approximately 265 minutes and an arsine life of approximately 200 minutes which is approximately twice as good as the same type of char currently being produced in accordance with the prior practice outlined in the foregoing description.

We claim:

A method of impregnating activated carbon with metal oxide which is substantially insoluble in water, said method consisting of forming an aqueous solution of a water soluble compound of said metal which is adapted upon heating to react and precipitate said metal oxide, partially saturating said carbon in said solution by prewetting the carbon therewith, immersing the prewetted carbon in a pool of said solution and substantially drenching the same, removing the drenched carbon from said pool, draining the excess liquid therefrom and finally causing a deposition of said metal oxide on said carbon and drying the same by directly contacting the carbon with an oxygen containing gas while maintaining said carbon at a temperature not in excess of 350° F.

JACQUE C. MORRELL.
GEORGE T. TOBIASSON.
JESSE F. WRIGHT.

REFERENCES CITED

The following references are of record in the file of this patent:

UNITED STATES PATENTS

| Number | Name | Date |
| --- | --- | --- |
| 708,946 | Welch | Sept. 9, 1902 |
| 947,715 | Lecoever | Jan. 25, 1910 |
| 1,262,416 | Warrick | Apr. 9, 1918 |
| 1,557,880 | Richter | Oct. 20, 1925 |
| 1,571,048 | Garrow | Jan. 26, 1926 |
| 1,631,052 | Oertel | May 31, 1927 |
| 1,635,012 | Seel | July 5, 1927 |
| 1,709,456 | Bojner et al. | Apr. 16, 1929 |
| 1,956,585 | Oglesby et al. | May 1, 1934 |
| 2,012,098 | Haase et al. | Aug. 20, 1935 |
| 2,130,731 | Carter | Sept. 20, 1938 |
| 2,197,792 | Erickson | Apr. 23, 1940 |
| 2,323,920 | Knudsen | July 13, 1943 |
| 2,349,249 | Desetti et al. | May 23, 1944 |

OTHER REFERENCES

"The Link-Belt Roto-Louvre Dryer," Book No. 1911 of Link-Belt Co., copyright 1941, pp. 12–15.